United States Patent
Arnold et al.

[11] Patent Number: 6,101,600
[45] Date of Patent: Aug. 8, 2000

[54] RESETTING A CPU

[75] Inventors: Kenneth W. Arnold, Houston; Rajesh A. Shah, Palms Spring, both of Tex.

[73] Assignee: Compaq Computer Corporation, Houston, Tex.

[21] Appl. No.: 08/609,289

[22] Filed: Mar. 1, 1996

[51] Int. Cl.[7] .................................................... G06F 9/00
[52] U.S. Cl. ............................................................ 713/1
[58] Field of Search .................................. 395/651, 652, 395/653, 200.5, 200.51, 200.52; 713/1, 2, 100; 709/220, 221, 222, 223

[56] References Cited

U.S. PATENT DOCUMENTS

| | | | |
|---|---|---|---|
| 4,590,556 | 5/1986 | Berger et al. | 395/651 |
| 4,947,478 | 8/1990 | Maeno | 395/651 |
| 5,070,450 | 12/1991 | Holman, Jr. et al. | 395/651 |
| 5,269,022 | 12/1993 | Shinjo et al. | 395/652 |
| 5,430,866 | 7/1995 | Lawrence et al. | 395/182.18 |
| 5,465,360 | 11/1995 | Miller et al. | 395/651 |
| 5,497,497 | 3/1996 | Miller et al. | 395/651 |
| 5,603,011 | 2/1997 | Piazza | 395/652 |

*Primary Examiner*—Dennis M. Butler
*Attorney, Agent, or Firm*—Sharp, Comfort & Merrett, P.C.

[57] ABSTRACT

A method for use in connection with resetting a CPU including requesting a first reset code stored in an inaccessible memory and redirecting the request to a second reset code stored in accessible memory.

A computer system including a CPU, a first memory that may become inaccessible, and a CPU reset facilitator configured to respond to a reset request from the CPU to the first memory at a time when it is inaccessible by diverting the CPU to a second memory.

26 Claims, 3 Drawing Sheets

RESETTING A CPU

BACKGROUND

This invention relates to resetting a CPU ("ROM").

The shared ROM contains firmware for two different microprocessors. The first microprocessor accesses the shared ROM only during boot and reset, while the second microprocessor intermittently accesses it throughout its operation. If the first microprocessor, on being reset, attempts to access the shared ROM, it may receive erroneous information if the shared ROM is simultaneously being accessed by the second microprocessor.

SUMMARY

In general, in one aspect, the invention features a method for use in connection with resetting a CPU comprising requesting a first reset code stored in an inaccessible memory, and redirecting the request to a second reset code stored in accessible memory.

Implementations of the invention may include one or more of the following. The inaccessible memory may be a shared ROM. The shared ROM may be inaccessible because it is being used by another device. The accessible memory may be a system memory. The request may be made by the CPU. The redirecting may be done by sending a jump instruction. The jump instruction may be a series of identical codes. The codes may be hexadecimal EAs. The method may include copying the second reset code from a shared ROM at boot. The method may include disabling access to the shared ROM by the CPU after the copying step. The method may include disabling access to the shared ROM during the redirecting step.

In general, in another aspect, the invention features a computer system comprising a CPU, a first memory that may become inaccessible, and a CPU reset facilitator configured to respond to a reset request from the CPU to the first memory at a time when it is inaccessible by diverting the CPU to a second memory.

Implementations of the invention may include one or more of the following. The first memory may be a shared ROM. The second memory may be a system memory. The first memory may become inaccessible because it is being used by another device. The response may be a jump instruction. The jump instruction may be a series of identical codes. The codes may be hexadecimal EAs. The computer system may include a reset code copied from the first memory to the second memory. The CPU reset facilitator may be configured to selectively prevent access to the first memory while the CPU reset facilitator is responding. The computer system may include a redundant array of inexpensive disks.

In general, in another aspect, the invention features a method for use in connection with resetting a CPU comprising copying a first reset code from a shared ROM at boot to provide a second reset code, disabling access to the shared ROM by the CPU after the copying step, requesting the second reset code stored in an inaccessible memory, redirecting the request to the copy of the first reset code stored in accessible memory, and disabling access to the shared ROM during the redirecting step.

In general, in another aspect, the invention features a computer system comprising a CPU, a first memory that may become inaccessible, a CPU reset facilitator configured to respond to a reset request from the CPU to the first memory at a time when it is inaccessible by diverting the CPU to a second memory, the second memory containing a reset code copied from the first memory, and the CPU reset facilitator being configured to selectively prevent access to the first memory while the CPU reset facilitator is responding.

Among the advantages of the invention are reduction of intermittent CPU malfunctions caused by blocked accesses to shared ROM.

Other advantages and features will become apparent from the following description and from the claims.

DESCRIPTION

Figure 1:
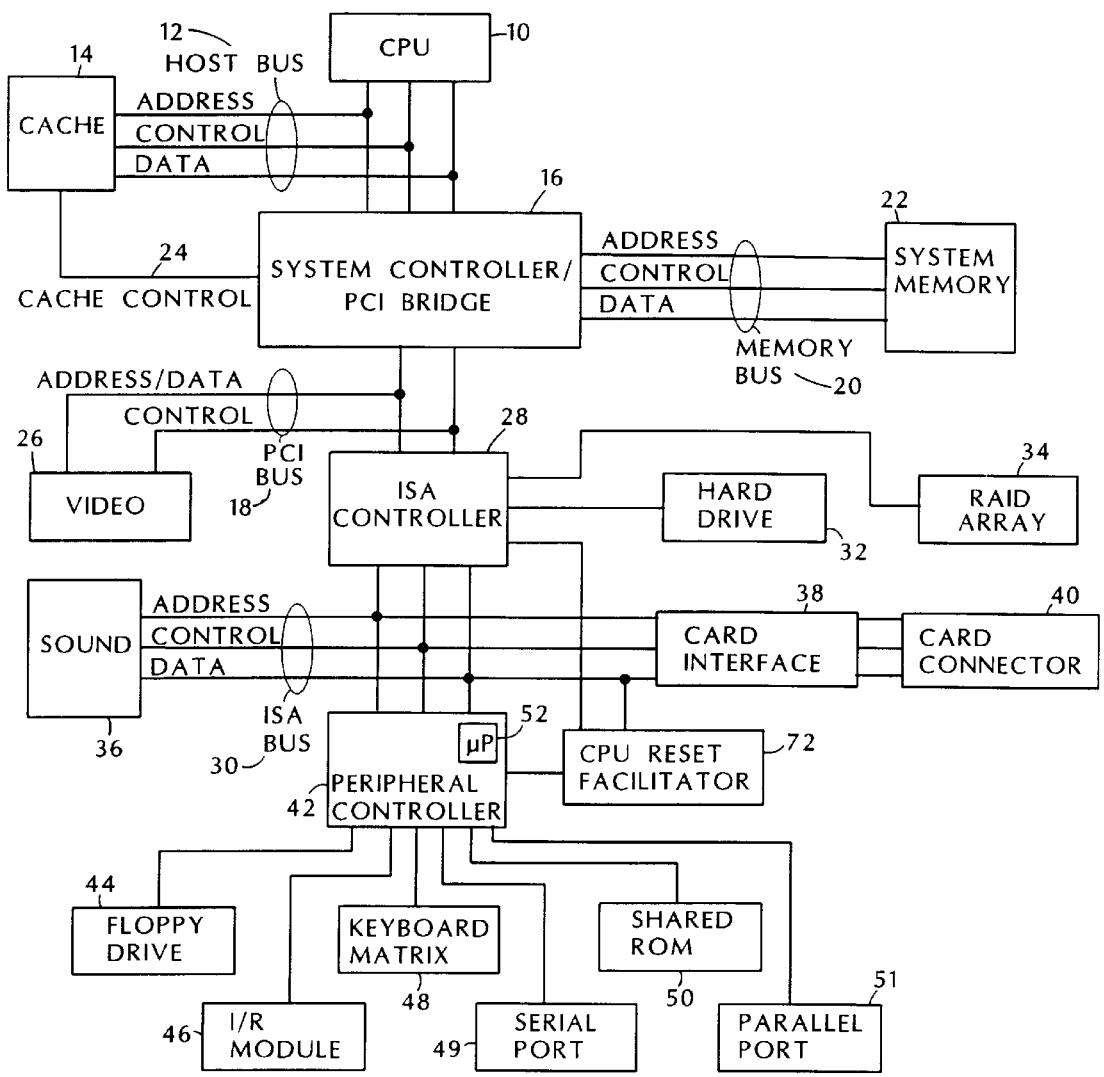
FIG. 1 is a block diagram of a computer system.

A computer system, illustrated in FIG. 1, has a central processing unit ("CPU") 10 connected to a host bus 12 having address, data, and control lines. A cache 14 is connected to the host bus and allows the CPU fast access to data it accesses frequently. A System Controller/PCI bridge 16 controls the interaction between the host bus and a peripheral component interconnect ("PCI") bus 18. The System Controller/PCI bridge provides an interface, via a memory bus 20, between a system memory 22 and the host bus or the PCI bus. The System Controller/PCI bridge also controls the cache through cache control signals 24. A video circuit 26 is connected to the PCI bus.

An ISA controller 28 manages the interaction between the PCI bus and an industry standard architecture ("ISA") bus 30. It also controls the PCI bus's interaction with the hard drive 32 and a redundant array of inexpensive disks ("RAID") 34. A circuit for producing sound 36 and a card interface 38 are connected to the ISA bus. Card connectors 40 are connected to the card interface.

A peripheral controller 42 controls the ISA bus's interaction with the floppy drive 44, an infrared (I/R) module 46, a keyboard matrix 48, a serial port 49, a shared ROM 50, and a parallel port 51. The peripheral controller includes a microprocessor ($\mu$P) 52.

The shared ROM contains code for both the CPU and the peripheral controller microprocessor 52. At boot time, the CPU copies the shared ROM's CPU code 60 from the shared ROM to a portion of system memory called "shadow RAM" 62, which the CPU may execute faster, see FIG. 2. The copied code includes the BIOS, the power on self test ("POST"), the setup program and other similar code. The CPU reset code 64 whose entry point is at physical address FFFFFFF0, and the peripheral controller microprocessor code 66, both of which are on the shared ROM, are not copied into the shadow RAM.

After boot time, the CPU only accesses the shared ROM to execute the CPU reset code. The peripheral controller microprocessor frequently accesses the shared ROM where most of its code is stored.

Early microprocessors, such as the 8088 and the 8086, could address only 1 megabyte of memory. The 80286, 80386, 80486 and PENTIUM processors (the "x86 microprocessors") have a much larger address space. The x86 microprocessors maintain backward compatibility with the 8088 and 8086 by operating in "real mode", in which they are limited to the address space of the 8088 or 8086 except during reset. The x86 microprocessors can also operate in a "protected mode", in which they can access the much larger address space.

Operating systems, such as OS/2 and Unix, switch the CPU back and forth between the real and protected modes. Some versions of these operating systems accomplish the switch from protected mode to real mode by resetting the CPU via external hardware, i.e. hardware external to the CPU itself. This is done by one of two means: (1) sending a command to the peripheral controller instructing it to actuate a CPU reset signal, or (2) writing to an external fast reset output port which actuates the CPU reset signal directly. Such a reset causes the CPU to transition into the real mode and execute its reset code. Part of this reset code causes the operating system to return to what it was doing before the hardware reset was actuated.

Figure 2:
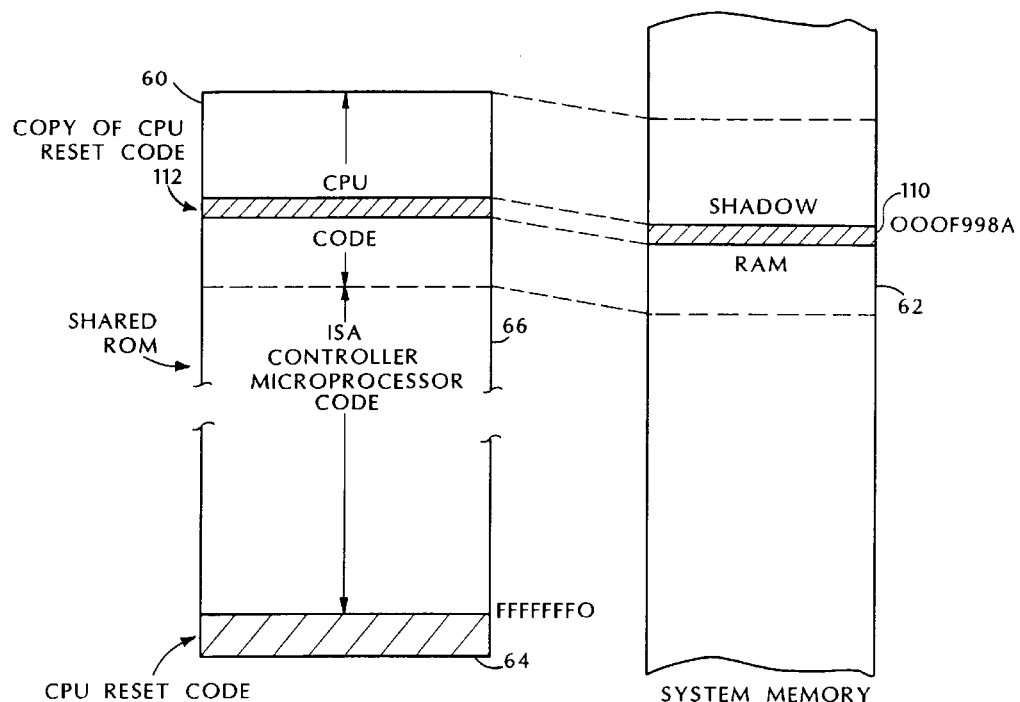
FIG. 2 is a diagram of shared ROM and system memory.

As mentioned, the CPU reset code 64 is located in shared ROM, see FIG. 2. At times, when the CPU attempts to access the shared ROM in order to retrieve the CPU reset code, it cannot do so because the peripheral controller microprocessor has control of the shared ROM. When this occurs, the CPU receives incorrect data instead of the reset code, which may cause it to malfunction.

Figure 3:
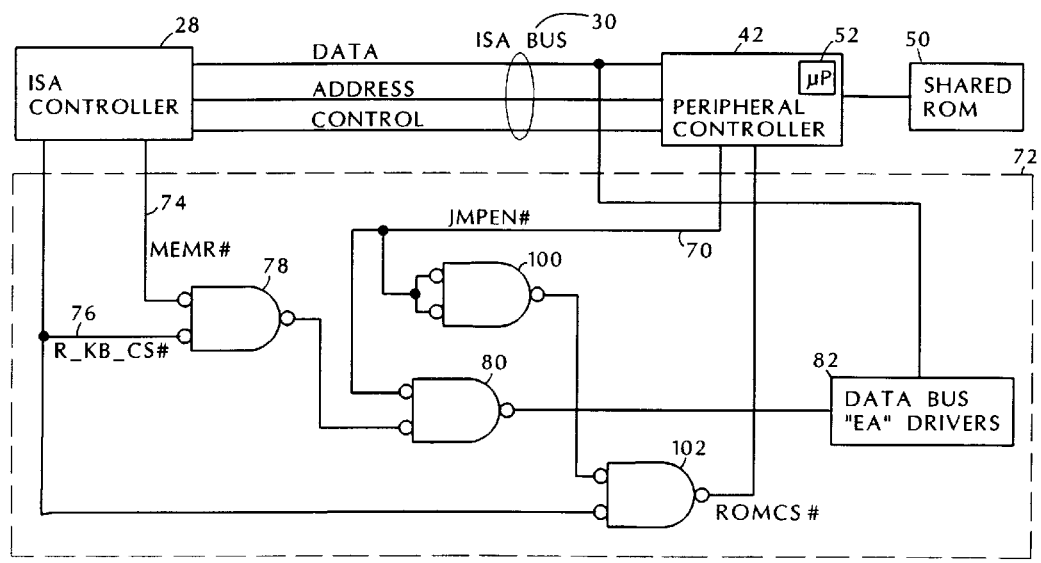
FIGS. 3 and 4 are block diagrams of portions of a computer system.

As seen in FIG. 3, during boot, after the portion of the shared ROM is copied to the shadow RAM, the CPU commands the peripheral controller to assert a JNPEN# signal 70, which inhibits all further accesses to the shared ROM by any device other than the peripheral controller microprocessor.

To aid in resetting the CPU, a CPU reset facilitator 72 connects to the peripheral controller, the ISA controller and the ISA data bus, as shown in FIGS. 1 and 3.

When the CPU is to be reset, it attempts to read instructions from address FFFFFFF0, which is the address of the CPU reset code in shared ROM. The read request passes through the System Controller/PCI bridge to the ISA controller, which asserts a NEMR# signal 74, indicating a CPU memory read, and a R_KB_CS# signal 76, indicating that the shared RON is to be accessed.

The output of gate 78 is driven low if both MEMR# and R_KB_CS# are low, indicating a CPU read from the shared ROM. The output of gate 80 is driven low if the output of gate 78 is low and if JMPEN# is low, indicating a CPU read from the shared ROM after the CPU has determined that all further accesses to the shared ROM should be by the peripheral controller microprocessor.

Figure 4:
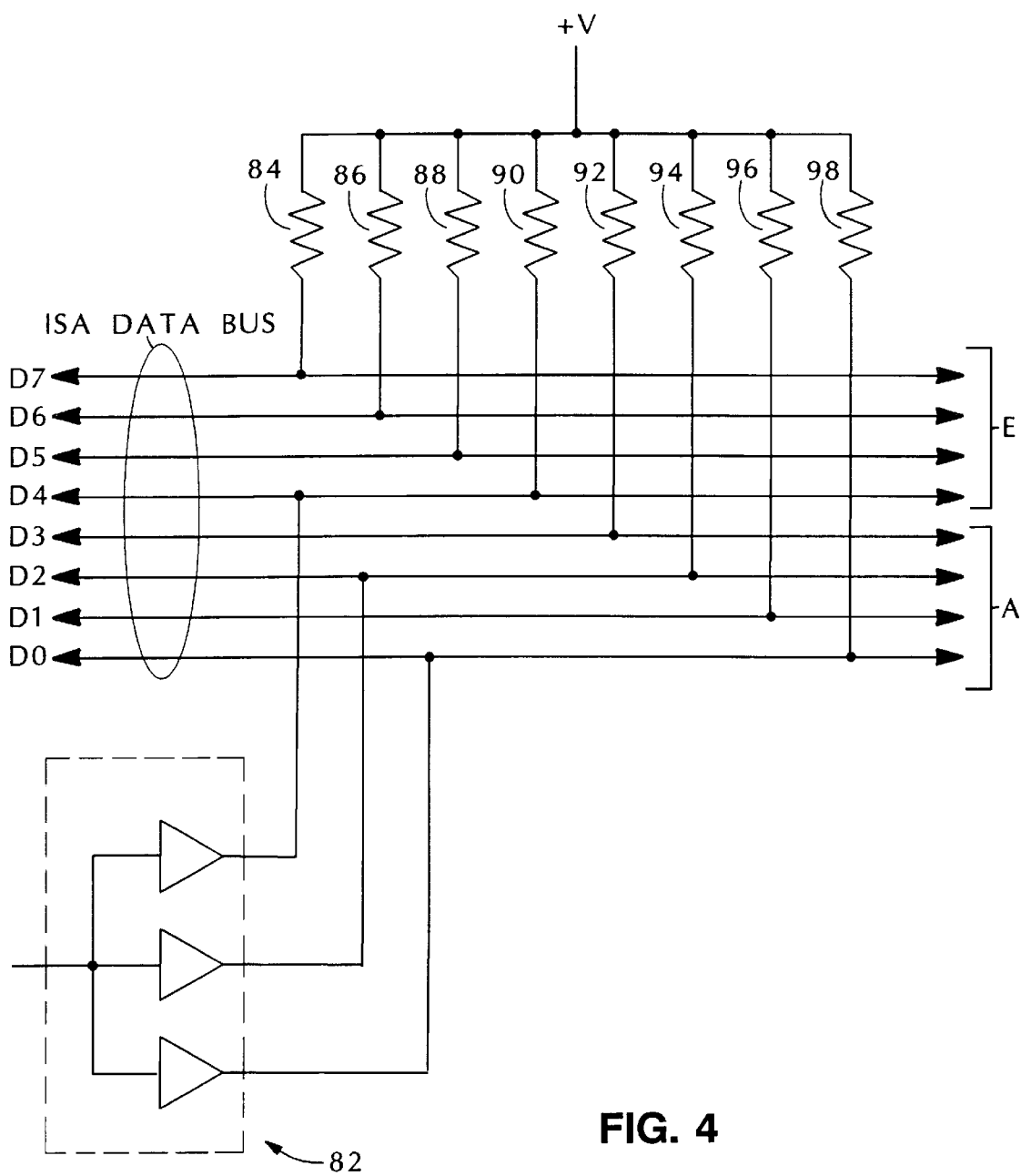

When the output of gate 80 is low, the outputs of data bus "EA" drivers 82 are driven low. The outputs of data bus "EA" drivers 82 drive low bits 0, 2 and 4 of the ISA data bus, as shown in FIG. 4, which are normally held high by pull-up resistors 90, 94, 98. The other bits of the ISA data bus are held high by pull-up resistors 84, 86, 88, 92, 96. Consequently, signals representing hexadecimal "EA" (binary 1110 1010) are driven onto the ISA data bus and returned to the CPU.

The JMPEN# signal, inverted by a gate 100, drives the output of a gate 102 high, which prevents the peripheral controller from driving shared ROM data onto the ISA data bus while the CPU read is proceeding. Before the CPU commands the peripheral controller to assert the JMPEN# signal, the output of the gate 102 follows the R_KB_CS# signal, allowing that signal to select the shared ROM.

The CPU, which is a member of the x86 microprocessor family, recognizes the returned "EA" as the opcode for a far jump ("JMP FAR"), realizes that a far jump requires five bytes to execute, and initiates four more reads from shared ROM to complete the instruction. Each of the reads returns an "EA", so that the instruction is a series of five "EAs".

The x86 encoding for a far jump is EA zz yy xx ww where wwxx is the segment address of the jump target and yyzz is the offset address. The far jump causes the CPU to begin executing the code located at the jump target address.

Because the CPU has just been reset, it is in the real mode. In the real mode, the physical address is computed by shifting the segment address to the left by four bits and adding the offset address. For a segment address of EAEA and an offset address of EAEA, the physical address is 000F998A.

When the CPU executes the command "EA EAEAE-AEA" it jumps to physical address 000F998A and begins executing the code at that location. Physical address 000F998A, 110, is located in shadow RAM, as shown in FIG. 2. A copy of the CPU reset code 112 is stored in shared ROM at the correct location so that when the portion of the shared ROM is copied, the copy of the CPU reset code will be copied into shadow RAM beginning at location 000F998A. Thus, when the CPU executes the command "EA EAEAEAEA" it will jump to physical address 000F998A, execute the copy of the CPU reset code at that location, and proceed just as if it had executed the reset code located in shared ROM.

What is claimed is:

1. A method for use in connection with resetting a CPU comprising:

requesting a first reset code stored in a memory which is inaccessible because it is being used by a second device, and redirecting the request to a copy of the first reset code stored in accessible memory wherein the redirecting is done by sending a jump instruction that comprises a series of identical codes, the identical codes each comprising a hexadecimal EA.

2. The method of claim 1 wherein the inaccessible memory comprises a ROM shared by the CPU and the second device.

3. The method of claim 1 wherein
   the accessible memory is a system memory.

4. The method of claim 1 wherein
   the request is made by the CPU.

5. The method of claim 1 wherein
   the redirecting is done by sending a jump instruction.

6. The method of claim 5 wherein
   the jump instruction is a series of identical codes.

7. The method of claim 6 wherein
   the codes are hexadecimal EAs.

8. The method of claim 1 wherein the memory that is inaccessible comprises a ROM, the method further comprising copying the reset code from the ROM at boot.

9. The method of claim 8 further comprising disabling access to the ROM by the CPU after the copying step.

10. The method of claim 9 further comprising disabling access to the ROM during the redirecting step.

11. A computer system comprising:
    a CPU;
    a first memory;
    a control device coupled between the CPU and the first memory such that the CPU can access the first memory by issuing an access request to the control device, the control device operable in a mode wherein the control device has exclusive access to the first memory; and
    a redirection circuit coupled to the CPU and to the control device, the redirection circuit configured to respond to an access request from the CPU to the first memory at a time when the control device has exclusive access to the first memory by diverting the CPU to a second memory.

12. The computer system of claim 11 wherein the first memory is a shared ROM.

13. The computer system of claim 11 wherein the second memory is a system memory.

14. The computer system of claim 11 wherein the response is a jump instruction.

15. The computer system of claim 11 wherein a first copy of a reset code is stored in the first memory and wherein a second copy of the reset code is stored in the second memory.

16. The computer system of claim 11 wherein the redirection circuit is configured to selectively prevent access to the first memory while the CPU redirection circuit is responding.

17. The computer system of claim 11 further comprising a redundant array of inexpensive disks coupled to the CPU.

18. A computer system comprising:
a CPU;
a first memory;
a control device coupled between the CPU and the first memory, the control device operable in a mode wherein the control device has exclusive access to the first memory; and
a redirection circuit coupled to the CPU and to the control device, the redirection circuit configured to respond to an access request from the CPU to the first memory at a time when the control device has exclusive access to the first memory by diverting the CPU to a second memory, wherein the response is a jump instruction and wherein the jump instruction is a series of identical codes.

19. The computer system of claim 18 wherein the codes are hexadecimal EAs.

20. A method for use in connection with resetting a CPU, the method comprising;
booting a computer system;
during the booting step, transferring a copy of a reset code from a ROM to a system memory;
disabling access to the ROM by the CPU after the transferring step;
issuing a request from the CPU to the ROM requesting access to the reset code stored in the ROM; and
redirecting the request for access of the reset code to the copy of the reset code stored in the system memory.

21. The system of claim 20 and further comprising disabling access to the ROM during the redirecting step.

22. A computer system comprising:
a CPU;
a system memory coupled to the CPU;
a bridge circuit coupled to an expansion bus;
a controller coupled to the expansion bus, the controller accessible by the CPU through the bridge circuit;
a first memory accessible by the CPU and by the controller, the first memory operable in a mode wherein the first memory is inaccessible to the CPU; and
a circuit coupled to the expansion bus and to the controller, the circuit configured to respond to an access request from the CPU to the first memory at a time when the first memory is inaccessible by diverting the CPU to a second memory, the second memory including a copy of the information requested by the CPU; and
a mass storage drive coupled for access by the CPU.

23. A computer system comprising;
a CPU;
a system memory coupled to the CPU;
a first bridge circuit coupled between the CPU and a first expansion bus;
a second bridge circuit coupled between the CPU and the second expansion bus;
a peripheral controller coupled to the second expansion bus, the peripheral controller accessible to the CPU through the first and second expansion buses;
a first memory coupled to the peripheral controller, the first memory operable in a mode wherein information stored in the first memory becomes inaccessible to the CPU;
a redirection circuit configured to respond to an access request from the CPU to the first memory at a time when the first memory is inaccessible by diverting the CPU to the system memory, and
a peripheral device controlled by the peripheral controller.

24. A computer system comprising:
a CPU;
a bridge circuit coupled to an expansion bus;
a peripheral controller microprocessor, the peripheral controller microprocessor accessible by the CPU through the bridge circuit;
a ROM that stores a reset code and may become inaccessible to the CPU when being used by the peripheral controller microprocessor;
a CPU reset facilitator configured to respond to a reset request from the CPU to the ROM at a time when the first memory is inaccessible by diverting the CPU to a second memory, the second memory containing a reset code copied from the ROM; and
the CPU reset facilitator being configured to selectively prevent access to the ROM while the CPU reset facilitator is responding.

25. The method of claim 1 wherein the second device comprises a peripheral controller.

26. A computer system comprising:
a CPU;
a first memory;
a control device coupled between the CPU and the first memory such that the CPU can access the first memory by issuing an access request to the control device, the control device operable in a mode wherein the control device has exclusive access to the first memory; and
means coupled to the CPU and to the control device for responding to an access request from the CPU to the first memory at a time when the control device has exclusive access to the first memory by diverting the CPU to a second memory.

* * * * *